(12) United States Patent
Hasegawa et al.

(10) Patent No.: US 6,243,334 B1
(45) Date of Patent: Jun. 5, 2001

(54) INFORMATION READING AND WRITING DEVICE FOR OPTICAL DISK

(75) Inventors: Shinya Hasegawa; Hiroyasu Yoshikawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/177,561

(22) Filed: Oct. 23, 1998

(30) Foreign Application Priority Data

Feb. 3, 1998 (JP) .................................................. 10-022068

(51) Int. Cl.[7] .................................................. G11B 7/135
(52) U.S. Cl. .................................. 369/44.23; 369/44.12; 369/103; 369/112.1
(58) Field of Search .............................. 369/44.23, 44.12, 369/44.41, 103, 109, 112, 46.38, 46.42, 44.11, 44.14, 112.1, 112.5

(56) References Cited

U.S. PATENT DOCUMENTS 5,412,631 * 5/1995 Komma et al. ............... 369/44.23 X

FOREIGN PATENT DOCUMENTS

| 2-29942 | 1/1990 | (JP) . |
| 2-126431 | 5/1990 | (JP) . |
| 3-150744 | 6/1991 | (JP) . |

* cited by examiner

*Primary Examiner*—Muhammad Edun
(74) *Attorney, Agent, or Firm*—Armstrong, Westerman, Hattori, McLeland & Naughton, LLP

(57) ABSTRACT

The present invention relates to an information reading and writing device for an optical signal, and the optical system is simplified by using a diffraction optical element. A semiconductor laser is used as a light source. There is provided an image formation lens for condensing a beam of light and forming an image on an optical disk medium. In an optical path between the semiconductor laser and the image formation lens, there is provided a hologram having a function of the hologram region diffraction optical element for detecting a tracking error signal of the medium and a focus detection error signal. Two optical detecting elements 24*a*, 24*b* for detecting the focus error respectively have two divided regions. Under the condition that the medium is in focus, beams of light diffracted in the two hologram regions 23*a*, 23*b* for detecting the focus become the convergent beams which are most converged on a dividing line of the respective optical detecting element and in the direction of the optical axis. The beams of light on two optical detecting elements are in a condition of substantial point symmetry with respect to the central axis of the hologram.

6 Claims, 8 Drawing Sheets

P-POLARIZATION

INFORMATION READING AND WRITING DEVICE FOR OPTICAL DISK

BACKGROUND OF THE INVENTION

1. Field of the Invention

The present invention relates to an information reading and writing device, for reading and writing an optical signal, which comprises a reading or writing head of an optical disk device or optical magnetic disk device used as a storage device of a computer.

In accordance with the development of a high performance computer, it becomes necessary to incorporate a storage device of large capacity into the computer. As the storage device to be incorporated into the computer, attention is given to a hard disk device and an optical disk device. Especially, the latter is advantageous in that the disk medium can be easily attached to and detached from the computer, that is, the disk medium can be easily replaced and further the capacity of the disk medium is large and the device is compact and the weight is small. For the above reasons, the optical disk device has become important.

2. Description of the Related Art

It is necessary to further reduce the price of an optical disk device or optical magnetic disk device. As a component to reduce the price, there is a strong demand for reducing the price of an optical head portion. Therefore, it has been conventionally necessary to provide a system in which the number of parts of an optical head can be decreased and the size and weight of the optical head can be reduced and also the labor to adjust the optical head can be reduced. On the other hand, in a disk medium in which both reading and writing of data can be conducted, there is a strong demand for increasing the luminous energy of laser beams, and also there is a strong demand for increasing the quantity of light for servo detection or transmission of an information signal.

For the above reasons, reduction of the number of parts, reduction of labor for adjustment and reduction of the size and weight are strongly required by integrating a large number of optical elements such as a polarization separating element of a polarization beam splitter or Wollaston prism, a beam splitter and a mirror into one package.

FIG. 1 is a view showing a signal detection optical system used for a conventional optical head of an optical magnetic disk. A laser beam emitted from a semiconductor laser 1, which is a light source, is made to be parallel by a collimator lens 2. After a portion of the parallel beam has been transmitted through a beam formation prism 3, it is directed to an optical magnetic disk, which is a storage medium, by a polarization beam splitter 4 and condensed onto an optical magnetic disk 6 by an objective lens 5.

When written data exists on the optical magnetic disk 6, an angle of polarization of light is rotated by the Kerr effect. That is, when written data exists on the optical magnetic disk 6, a laser beam of P-polarization light component used for detection is rotated by an angle of θk by the Kerr effect. Therefore, a small quantity of S-polarization light component is generated. Polarization light components (S-component and P-component) of the beam which has returned from the optical magnetic disk 6 are reflected on the polarization beam splitter 4. A beam of light, which have been reflected on the polarization beam splitter 4, are reflected on the polarization beam splitter 7. Then, the beam of light passes through a ½ wave plate 8 and condenser lens 9. After that, the beam of light is separated into an S-polarization light component and a P-polarization light component by the polarization light beam splitter 10.

The S-polarization light component and the P-polarization light component are respectively incident on the light detectors 11, 12. When a difference in the intensity of these two signals are found, it is possible to detect a signal.

On the other hand, polarization light components of the beam which has returned from the optical magnetic disk 6 is reflected on the polarization beam splitter 4. A portion of the beam of light, which has been reflected on the polarization beam splitter 4, is reflected on the polarization beam splitter 7 and transmitted through the condenser lens 13. Then, the beam of light is incident on the beam splitter 14. After that, a focus is detected by the push-pull method in which the knife edge 15 and the optical detector 16 are used, and the track is detected by an optical detector 17.

As described above, in a conventional signal detection optical system of the optical head for the optical magnetic disk shown in FIG. 1, it is necessary to provide a large number of optical elements such as a polarization separating element of a polarization beam splitter or others. When these optical elements are incorporated, a large amount of labor is required for adjusting these optical elements.

There is proposed a technique in which the number of optical elements such as a beam splitter and others can be reduced by using a hologram element having a plurality of hologram regions in an optical head for an optical magnetic disk.

For example, Japanese Unexamined Patent Publication No. 3-150744 discloses a technique in which a hologram element which has two hologram regions arranged symmetrically with respect to a dividing line perpendicular to the track direction of a storage medium is used and a recording signal is detected by a difference between beams of diffracted light sent from these two hologram regions.

As described above, in the conventional optical head of the optical magnetic disk device, it is necessary to provide a large number of optical elements, and also a large amount of time is required for adjusting the optical elements.

SUMMARY OF THE INVENTION

In the present invention, the number of parts and the number of mandays required for adjustment are reduced and also the size and weight of the device are reduced when a hologram is incorporated into a package of a semiconductor laser together with the semiconductor laser without using a large number of optical elements such as a polarization splitting element (polarization beam splitter, Wollaston prism and so forth), a beam splitter and a mirror.

The present invention provides an optical signal information reading and writing device comprising: a semiconductor laser used as a light source; an image formation lens for condensing a beam of light sent from the semiconductor laser so as to form an image on an optical disk medium; a hologram arranged on an optical path between the semiconductor laser and the image formation lens, having respective hologram regions which function as diffraction optical elements for detecting a tracking error signal and a focus detection error signal; and optical detection elements for detecting the tracking error signal and the focus detection error signal by detecting a beam of light diffracted in the respective hologram regions; wherein two optical detecting elements for detecting a focus error are arranged so that both optical detecting elements can have two-divided regions, beams of light diffracted by the two hologram regions for detecting the focus error are convergent beams, which are most converged in the optical axis direction on the respective splitting line of the optical detecting element for detecting the focus error under the condition that the optical disk is in focus, and beams of light on the two optical detecting elements for detecting the focus are arranged in a condition of point symmetry with respect to a central axis of the hologram.

According to the present invention, beams of light are arranged in a condition of point symmetry with respect to the central axis of the hologram. Therefore, even if a tolerance of thickness is allowed on the base plate of the hologram, the focus set can be adjusted when the hologram is adjusted by rotation.

A diffraction direction of beams of light diffracted in the two hologram regions for detecting the focus error contains two components of a direction connecting the two hologram regions and a direction perpendicular to the direction connecting the two hologram regions, and the beams of light on the two optical detecting elements for detecting the focus error are in a condition of point symmetry with respect to the central axis of the hologram.

The semiconductor laser, the hologram and the optical detecting element are integrated into one package, and the hologram is composed in such a manner that the beams of light diffracted in the two hologram regions for detecting the focus are converged at a position of point symmetry with respect to an optical axis of emergent light of the semiconductor laser, and the focus error is detected by the optical detecting element.

The semiconductor laser, the hologram and the optical detecting element are integrated into one package, and the hologram has two different hologram patterns in which beams of light diffracted in the two hologram regions for detecting the focus are made asymmetrical with respect to the optical axis of emergent light of the semiconductor laser so that the respective—primary light can not be incident on the optical detecting element for detecting the focus error of each other.

The semiconductor laser, the hologram and the optical detecting element are integrated into one package, and the two hologram regions for detecting the focus error and the two hologram regions for detecting the tracking error are respectively divided in a direction perpendicular to each other.

The semiconductor laser, the hologram and the optical detecting element are integrated into one package, and the two hologram regions for detecting the focus error and the two hologram regions for detecting the tracking error are respectively divided into directions perpendicular to each other, adjustment of offset for detecting the tracking error is conducted by moving the hologram in the directions of the two hologram regions for detecting the tracking error, and adjustment of offset for detecting the focus error is conducted by the adjustment in a direction perpendicular to the hologram moving direction for detecting the tracking error and also by the adjustment in a direction of rotation of the hologram.

BRIEF DESCRIPTION OF THE DRAWINGS

FIGS. 4(a) and 4(b) are views showing an arrangement of the hologram and the optical detecting element of the present invention, wherein FIG. 4(a) is a view showing a state in which the thickness of a base plate is uneven, and FIG. 4(b) is a view showing a state in which offset is removed by moving the hologram;

DETAILED DESCRIPTION OF THE EMBODIMENTS

Referring to the accompanying drawings, an embodiment of the present invention will be explained in detail below.

Figure 1:
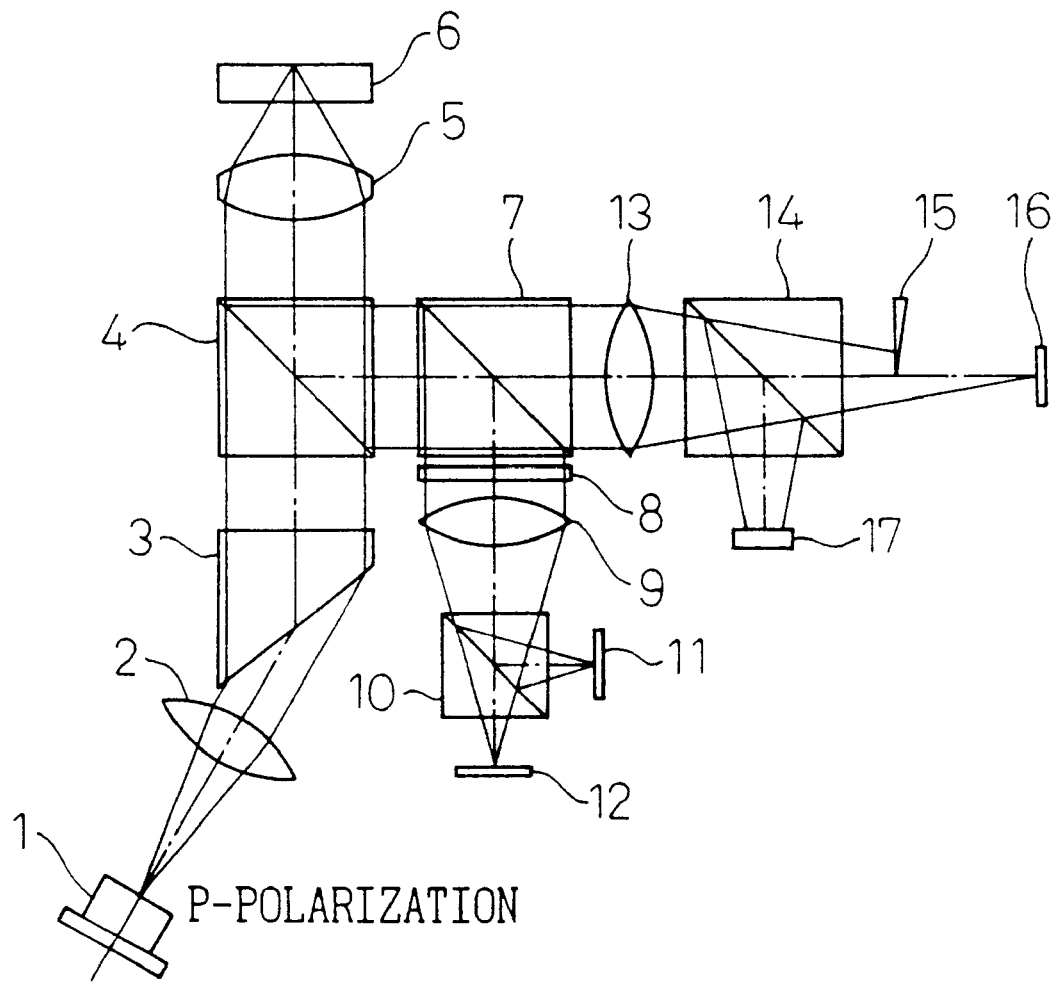
FIG. 1 is a schematic illustration of a conventional optical head for an optical magnetic disk known in the prior art.
Figure 2:
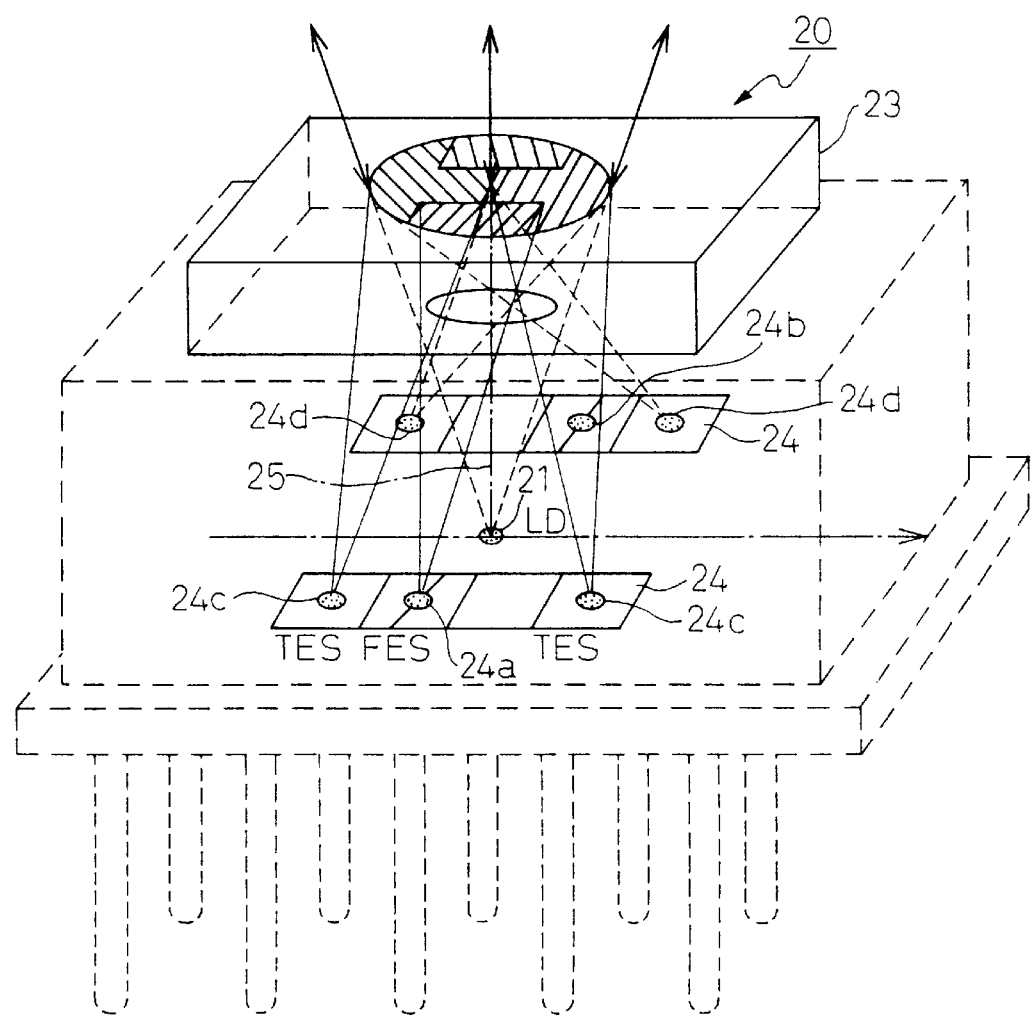
FIG. 2 is a view showing an appearance of an optical head for an optical magnetic disk of the present invention.

FIG. 2 is a view showing an appearance of the embodiment of the present invention. In the information reading and writing device for reading and writing information of the present invention, the optical system 20 of the optical head includes a semiconductor laser 21, a hologram 23 for conducting tracking and detection of the focus, and an optical detection element 24, which are integrated with each other into one body. Specifically, the semiconductor laser 21 and the optical detecting element 24 are integrally formed on the base plate, and the above components are integrated with the hologram 23 so that they are formed into one package. In this case, the present invention is characterized in that: the optical detecting element 24a for focus is arranged in a condition of substantial point symmetry with respect to the optical axis 25 of the semiconductor laser 21.

As an application of the present invention, a focus error is detected by a double knife edge method in which two focus beams are used for detection. This method is advantageous in that the sensitivity is very high in a drawing range with respect to deviation of the focus.

In the detecting method having the above advantages, the following problems may be conventionally encountered. FIG. 3 is a view of conventional example known in the prior art in which a diffraction optical element is used. In this conventional example, the diffraction optical element is integrally incorporated into an optical system composed of a semiconductor laser and an optical detecting element. That is, in the hologram 23 shown in FIG. 3, there are provided a pair of hologram regions 23a, 23b for detecting a focus error arranged symmetrically with respect to Y-axis, and also there are provided a pair of hologram regions 23c, 23d for detecting a tracking error arranged symmetrically with respect to X-axis. The optical detecting elements 24a, 24b of a signal (FES) for detecting the focus error and the optical detecting elements 24c, 24d of a signal (TES) for detecting the tracking error are arranged on one side of the dividing line (X–X') in such a manner that a pair of them are arranged symmetrically with Y-axis.

Figure 3A:
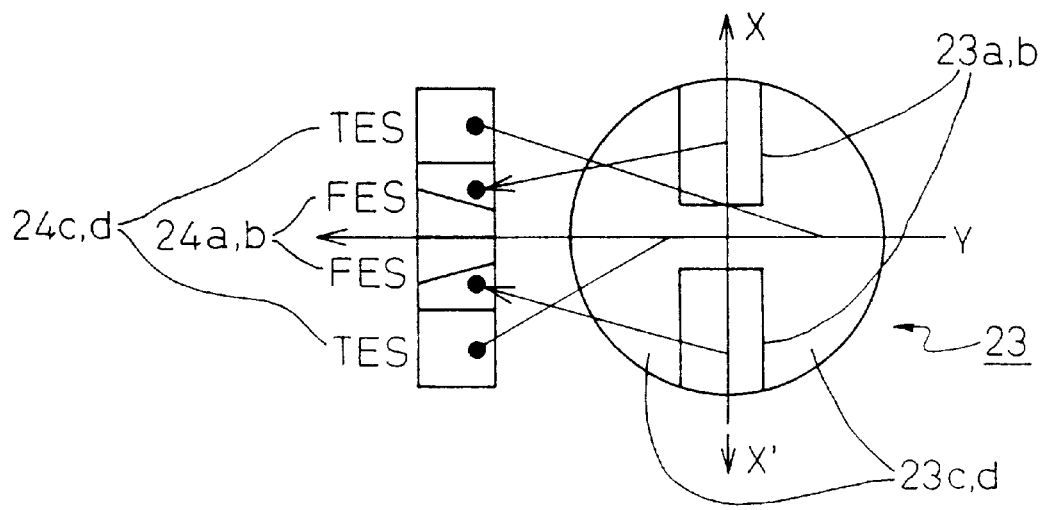
FIG. 3(a) is a view for explaining problems caused in a conventional example in which optical detecting elements for detecting a focus error are arranged symmetrically with respect to a dividing line, and also showing a state in which a dimensional allowance is provided in parts.
Figure 3B:
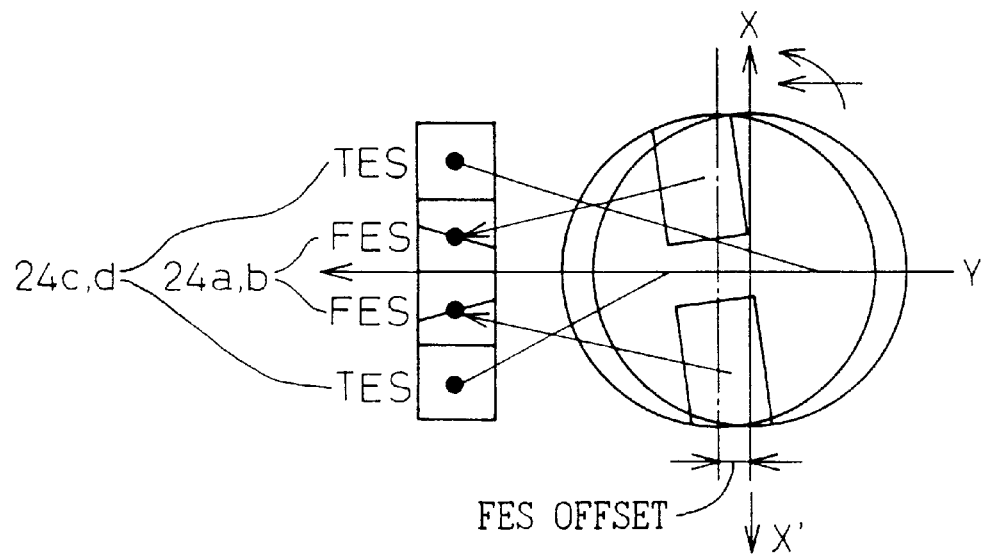
FIG. 3(b) is a view same as FIG. 3(a), but showing a state in which offset is removed by moving a hologram.

When a dimensional tolerance is allowed for the parts, that is, when errors exist in the size of the optical detecting element, height of the cap and thickness of the base plate of the diffraction grating, as shown in FIG. 3(a), beams of light for detecting the focus error do not come onto a dividing line of the optical detecting elements 24a, 24b of FES. Therefore, offset is generated. However, as shown in FIG. 3(b), offset of FES is removed when the hologram is moved or rotated in the direction of Y.

Especially, in the case of an error caused in the thickness direction of the base plate, as shown in FIG. 3(a), beams of light at the optical detecting elements 24a, 24b of FES deviate in the direction of Y. Therefore, the hologram is moved to the direction of Y for adjustment. However, due to the foregoing, a region of the hologram for tracking deviates, and offset is generated. In order to reduce an amount of offset of the track, the adjustment of movement of the diffraction grating for adjusting offset for focus must be restricted. For example, in order to reduce an amount of offset of tracking to a value not higher than 0.07 μm, it is necessary to keep an error of the thickness of the base plate of the hologram to be a value not higher than ±10 μm, which disadvantageously increases the manufacturing cost. For the same reasons, when the optical detecting element is attached, the dimensional accuracy of parts becomes very severe.

According to the present invention, as shown in FIG. 4, the optical detecting elements for detecting the focus are arranged in a condition of substantial point symmetry with respect to the optical axis of the semiconductor laser. That is, in FIG. 4, a pair of optical detecting elements 24a, 24b of the focus error detecting signal (FES) are arranged on the base plate so that they can be in a condition of point symmetry with respect to the optical axis 21a of the semiconductor laser 21. A pair of optical detecting elements 24c, 24d of the signal (TES) for detecting tracking error are arranged in the same manner.

Figure 4A:
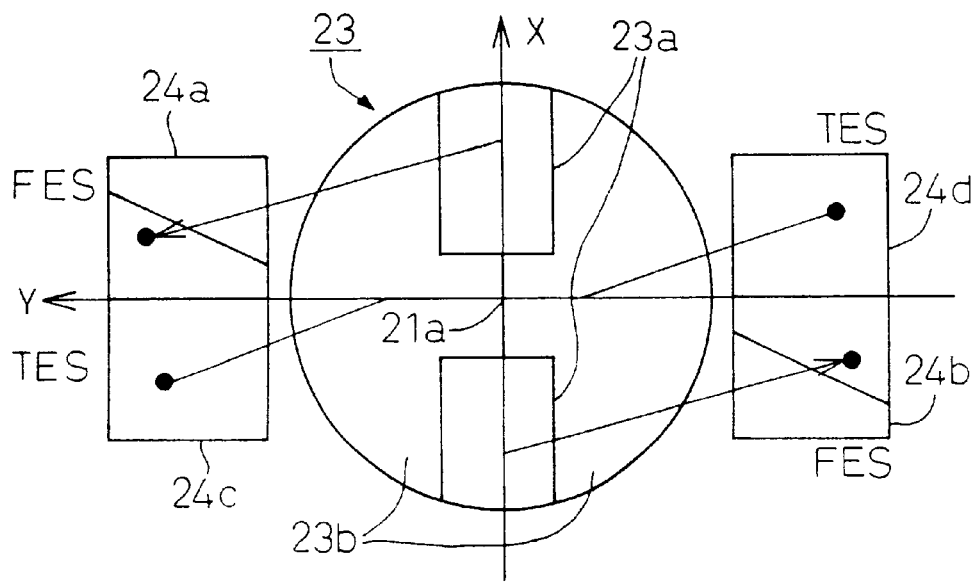
Figure 4B:
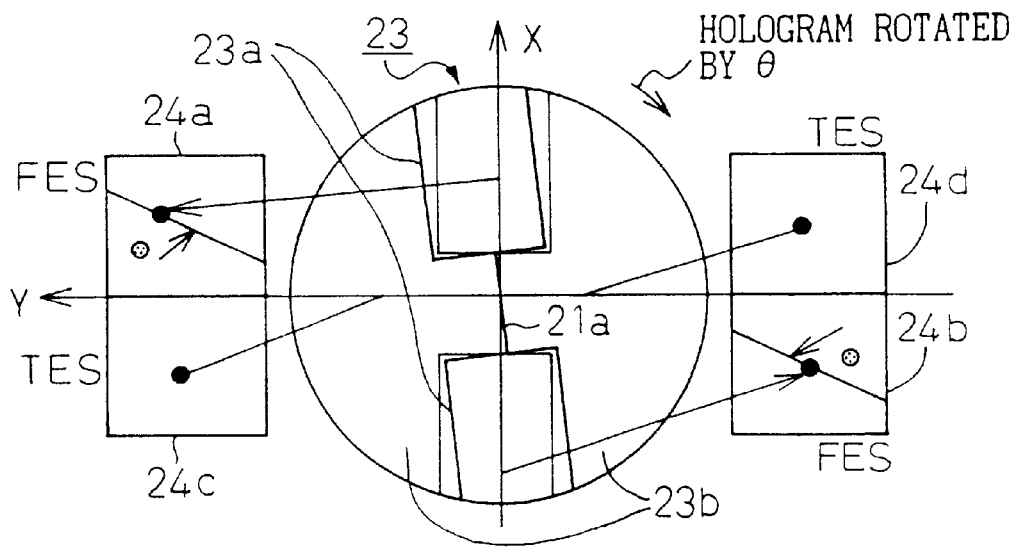

When the thickness of the base plate deviates from a predetermined value or the thickness of the base plate is not uniform, beams of light for detecting the focus error do not come onto the dividing lines of the optical detecting elements 24a, 24b of FES as shown in FIG. 4(a). On the other hand, even if an error is caused in the thickness of the base plate, the adjustment of focus offset can be conducted by rotating the hologram as shown in FIG. 4(b). For example, even if thickness of the base plate of the hologram 23 is ±200 μm, it is possible to remove the offset of focus by the rotation (θ) of the hologram 23 of an angle of ±0.3°. Therefore, offset of tracking is seldom generated.

Figure 5A:
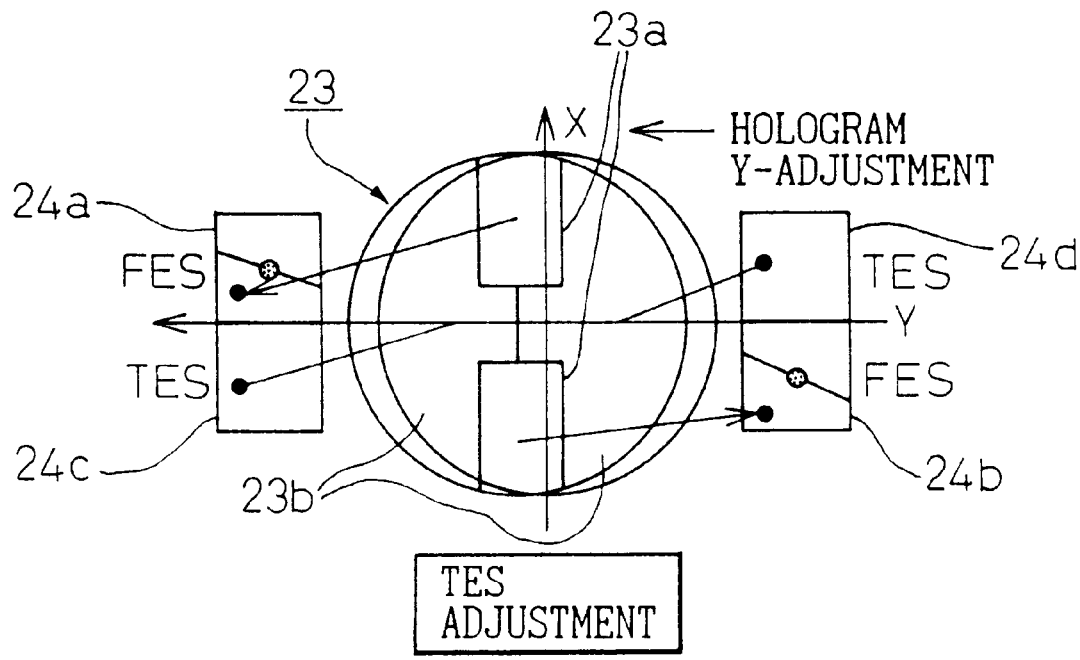
FIG. 5(a) is a view showing adjustment of the hologram, particularly adjustment of TES.
Figure 5B:
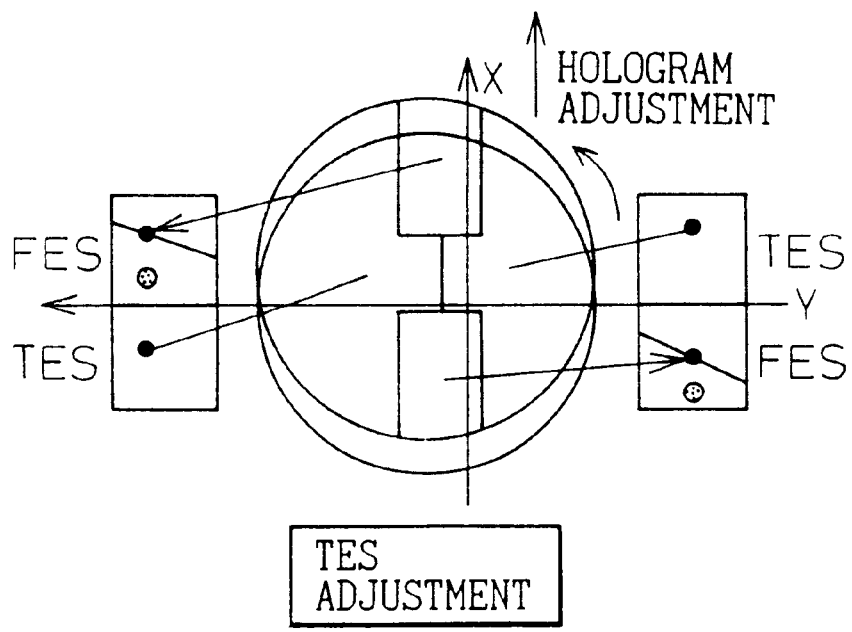
FIG. 5(b) is a view showing adjustment of the hologram, particularly adjustment of FES.

Next, when a semiconductor laser of the light source is attached while being inclined, a quantity of light of TES becomes unbalanced. In this case, problems of offset of TES are caused. Study has been made into the above case. In this case, in the present invention, when a quantity of light of TES is unbalanced, offset of TES is removed by moving the hologram 23 in the direction of the Y-axis as shown in FIG. 5(a). With respect to TES, it is sufficient that the beam of light enters the optical detecting element. Next, as described before, since the beam of light for FES does not come onto the dividing line in the detecting element of FES because of the hologram, the error of the optical detecting element and the offset adjustment of TES, the hologram 23 is moved to the direction of X-axis and rotated and two beams of light for FES can be set on the dividing line of the two detecting elements for FES as shown in FIG. 5(b). Due to the foregoing, it becomes possible to remove the offset of FES. At this time, concerning TES, since the hologram is not moved to the direction of Y, the offset of TES is not newly generated, and it is possible to obtain a signal of high accuracy by conducting an independent adjustment. In this system, even if the thickness of the hologram base plate deviates by ±200 μm and the optical axis of the semiconductor laser inclines by ±2°, it is possible to simultaneously remove the offset of FES and TES as shown in FIG. 5(b). By positioning the hologram as described above, it is possible to obtain an excellent optical head easily when an adhesive agent is dripped and cured around the hologram 23 in FIG. 2.

Figure 6:
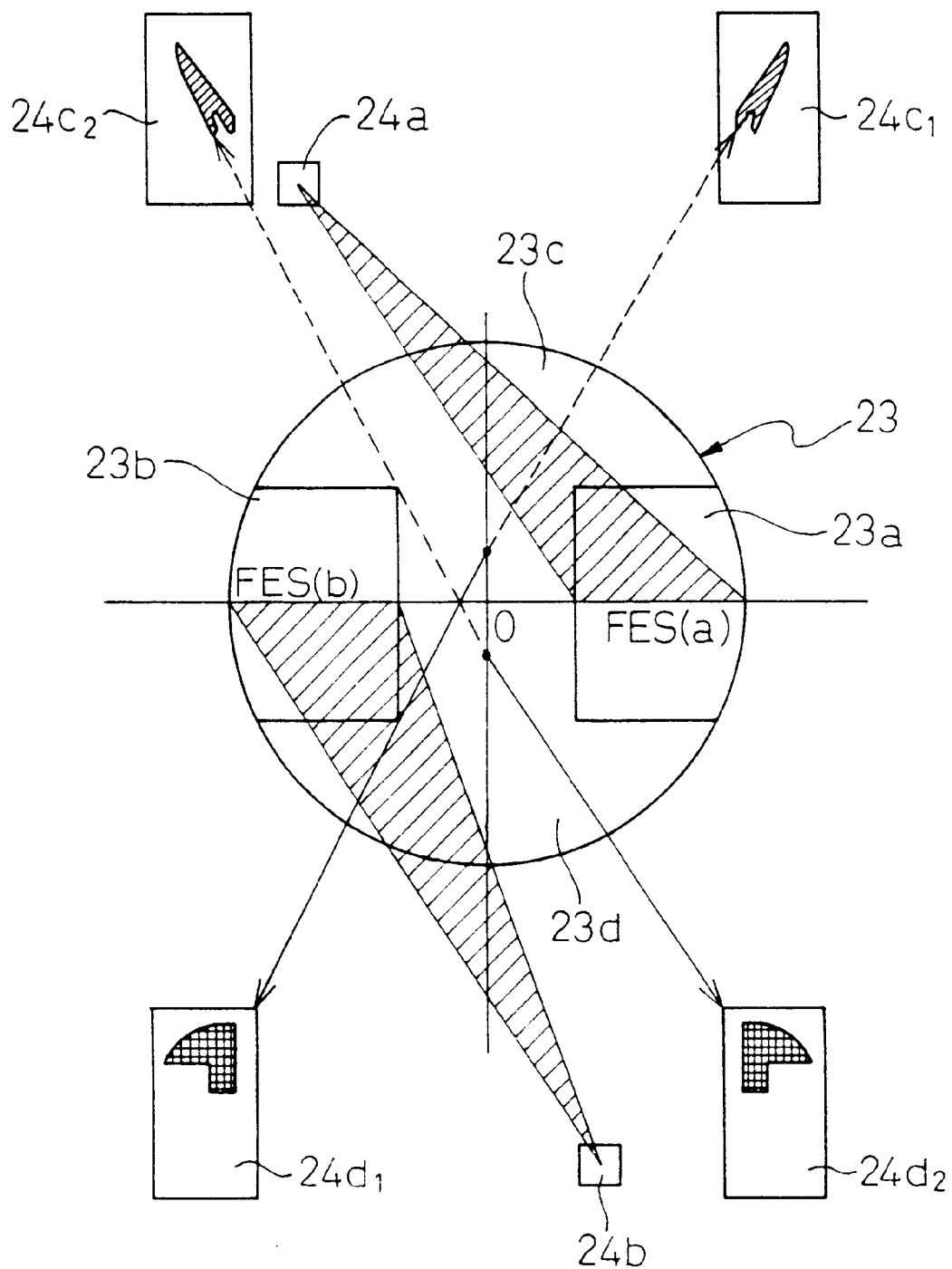
FIG. 6 is a view showing an example of the arrangement of the hologram region and the optical detecting element of the present invention.

Next, explanations will be made into a hologram having a plurality of hologram regions. FIG. 6 is an upper view of an arrangement of the hologram and the optical detecting element. There are provided a plurality of hologram regions 23a to 23d (a, b, c and d) in the hologram 23. Reference numerals 23a, 23b are hologram regions for focus servo, and reference numerals 23c, 23d are hologram regions for tracking servo. Of course, the size of the hologram 23 is determined by a distribution of a quantity of light required by the respective optical magnetic disk device.

Beams of ±primary diffracted light sent from the hologram regions 23c, 23d are respectively incident on the detecting elements $24c_1, 24d_1, 24c_2, 24d_2$ for tracking servo, so that tracking servo can be carried out. Phases $\Phi_H c$, $\Phi_H d$ of the hologram regions 23c, 23d are expressed by the following equations.

$$\Phi_H c = \Phi c - \Phi o$$

$$\Phi_H d = \Phi d - \psi o$$

where $\Phi c$ and $\Phi d$ are respectively phases at the hologram on the wave surface converging on the detecting elements $24c_1$, $24d_1$ for tracking servo.

In the above equations, $\Phi o$ is a phase of the wave surface of the spherical surface of the semiconductor laser incident on the hologram 23.

In the same manner, beams of diffracted light sent from the hologram regions 23a, 23b are incident on the detecting elements 24a, 24b for focus servo, so that focus servo can be carried out. Phases $\Phi_H a$, $\Phi_H b$ of the hologram regions 23a, 23b are expressed by the following equations.

$$\Phi_H a = \Phi a - \Phi o$$

$$\Phi_H b = \Phi b - \Phi o$$

where $\Phi a$ and $\Phi b$ are respectively phases at the hologram on the wave surface converging on the detecting elements 24a, 24b.

Focus error signal servo (FES) and tracking error signal servo (TES) can be detected by the following equations.

$$FES = (A+C) - (B+D)$$

$$TES = c - d$$

where A, B, C and D (quantity of detected light) are the detecting sections of the two-divided detectors 24a, 24b for FES, and c and d (quantity of detected light) are respectively a summation signal of the detecting sections of the optical detectors $24c_1$, $24d_1$ for TES and a summation signal of the detecting sections of the optical detectors $24c_2$, $24d_2$.

Next, another example will be be shown below. When beams of light for focus detection are in a condition of point symmetry with respect to the optical axis of the semiconductor laser, the minus (−) primary light sent from each hologram region becomes close to the minus (−) primary light to be used. Therefore, it tends to be an error signal. However, it is possible to remove the above error signal by appropriately determining the thickness of the base plate and the pitch of the hologram. However, in order to provide a higher positive, it is preferable that a position of the focus beam is somewhat shifted from a position of point symmetry. Due to the foregoing, the influence of the error signal can be eliminated. The optical detecting elements are shifted from each other by 300 to 500 μm.

Concerning the method of making the above hologram, the hologram is directly drawn by means of an electron beam or a laser beam. When the hologram is directly drawn, it is necessary to enhance the efficiency by inclining a cross-section of interference fringes of the hologram, which can be accomplished by means of multiple image drawing. Another method of making the hologram is described as follows. A hologram pattern, the size of which is larger than the original hologram pattern, is directly drawn beforehand. Then it is reduced by the stepper so as to make a mask, and then the pattern is transferred by means of photolithography. In this case, photoresist is used for the mask, and serration may be formed by etching conducted by means of ion beam. It is also possible to make the hologram by holographic exposure while the exposure system and the hologram are used as an auxiliary exposure system.

Figure 7:
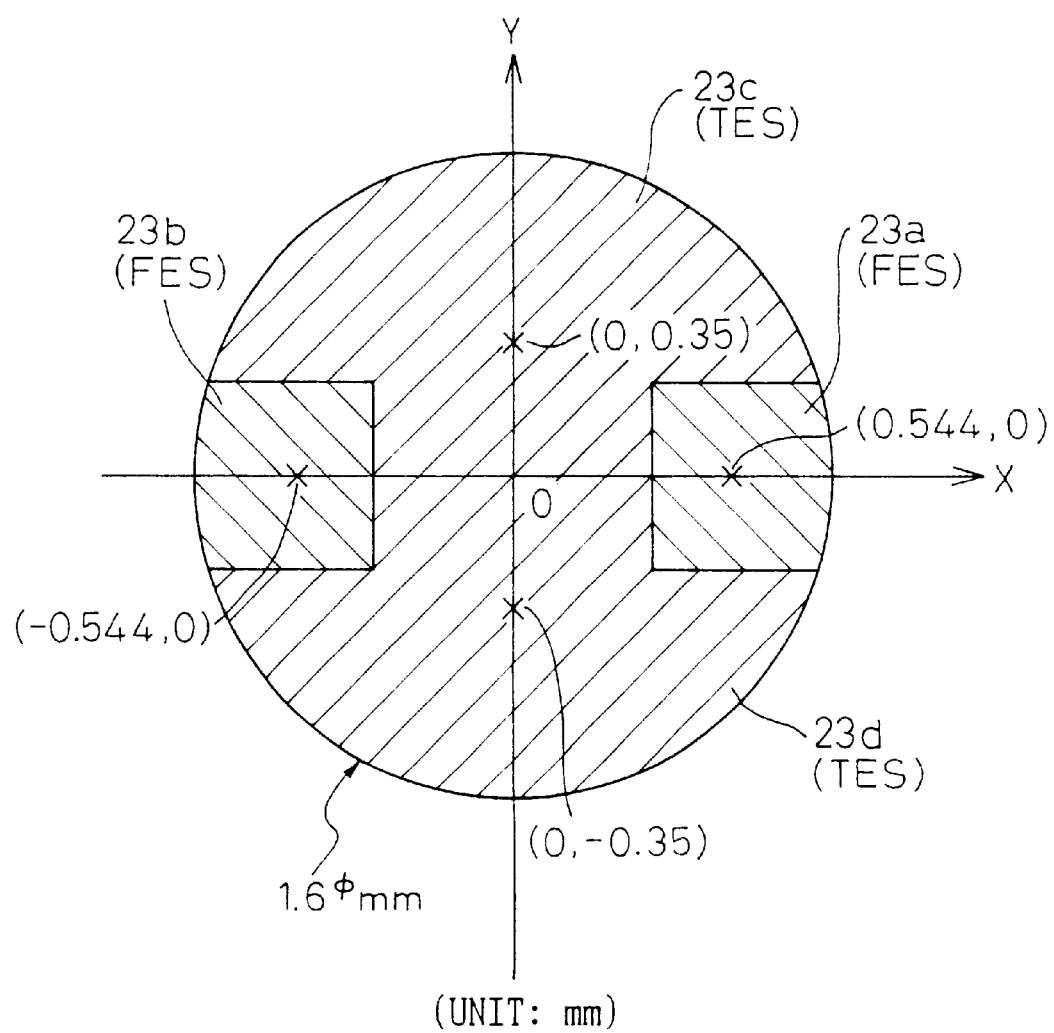
FIG. 7 is a view showing a phase $\Phi((x, y)$ for determining a stripe pattern of the hologram of the present invention.

FIG. 7 is a schematic illustration for finding the phase $\phi$ (x, y) to determine a stripe shape of the hologram.

The phase $\phi$ (x, y) to determine a stripe shape of the hologram is expressed by the following equation.

$$\phi(x, y) = C_1 X + C_2 Y + C_3 X^2 + C_4 XY + C_5 Y^2 + C_6 X^3 + C_7 X^2 Y + C_8 XY^2 + C_9 Y^3 + C_{10} X^4 + C_{11} X^3 Y + C_{12} X^2 Y^2 + C_{13} XY^3 + C_{14} Y^4$$

Figure 8:
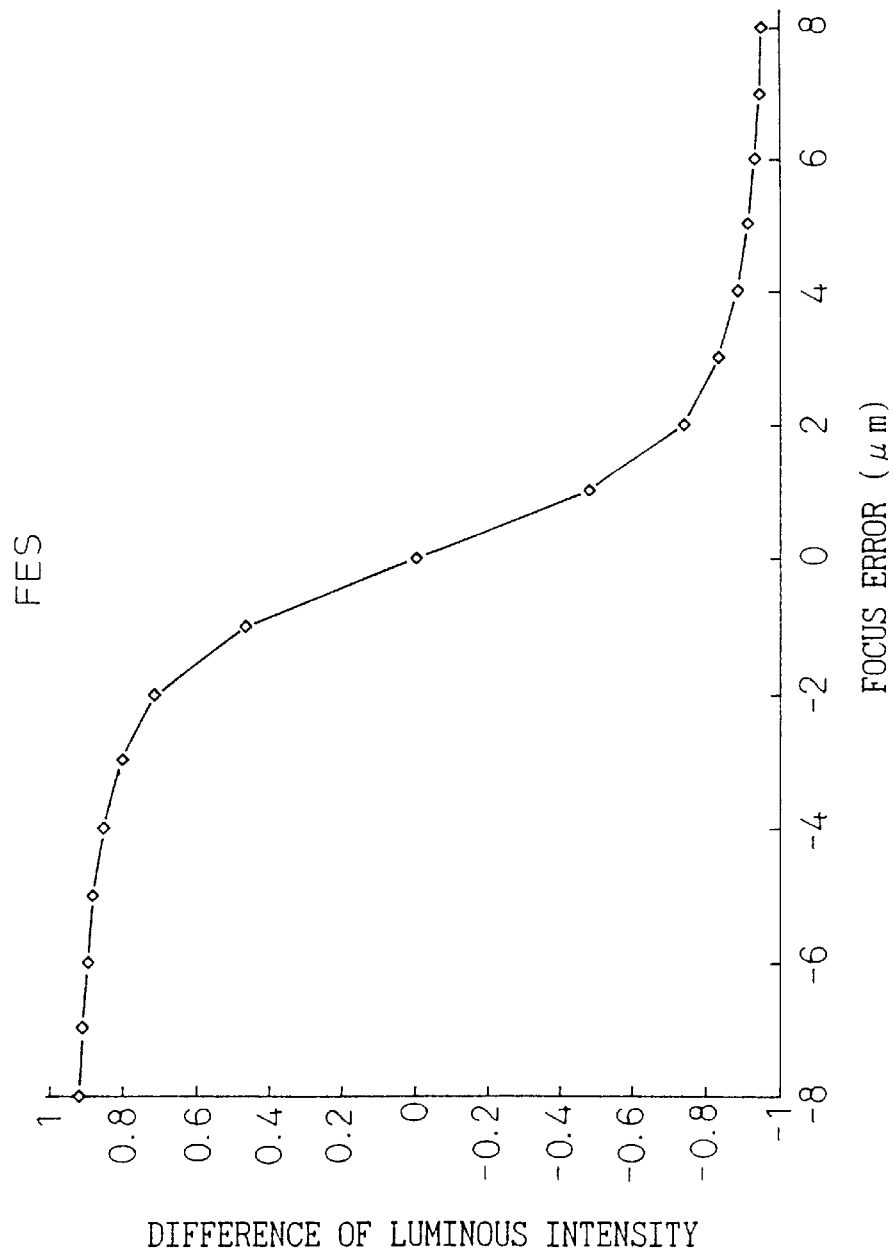
FIG. 8 is a graph for explaining a relationship between focus error and focus speed.

FIG. 8 is a graph showing the focus speed of the hologram designed as described above. The horizontal axis expresses an error of focus, wherein the unit is μm. The vertical axis expresses a difference in quantity of light between the optical detecting elements 24a, 24b used for the detection of focus error, wherein the difference in quantity of light is shown by a ratio. It can be seen on this graph that it is possible to obtain a sufficiently high focus speed with respect to the focus error. In this design, the phase distribution to determine a stripe shape of the hologram is defined by [Equation 1], and the coefficient is given by (B). In this case, the wave length of the semiconductor laser beams is 685 nm, the diameter of the hologram region is 1.6 mm, and the interval between the semiconductor laser and the lower surface of the hologram is 2.5 mm.

The embodiment of the present invention is explained in detail referring to the accompanying drawings. However, it should be noted that the present invention is not limited to the above specific embodiments, and variations and modifications may be made by a person skilled in the art without departing from the spirit and scope of the present invention. As explained above, according to the present invention, it is possible to realize a compact and highly reliable optical disk device or optical magnetic disk device at low cost.

What is claimed is:

1. An optical signal information reading and writing device comprising:
   a semiconductor laser used as a light source;
   an image formation lens for condensing a beam of light sent from the semiconductor laser so as to form an image on an optical disk medium;
   a hologram arranged on an optical path between the semiconductor laser and the image formation lens, having respective hologram regions which function as diffraction optical elements for detecting a tracking error signal and a focus detection error signal;
   optical detection elements for detecting the tracking error signal and the focus detection error signal by detecting beams of light diffracted in the respective hologram regions; and
   two optical detecting elements for detecting a focus error arranged so that both optical detecting elements have two-divided regions, beams of light diffracted by the two hologram regions for detecting the focus error are convergent beams, which are mostly converged in the optical axis direction on the respective splitting line of the optical detecting element for detecting the focus error under the condition that the optical disk is in focus, and beams of light on the two optical detecting elements for detecting the focus are arranged in a condition of point symmetry with respect to a central axis of the hologram.

2. An optical signal information reading and writing device according to claim 1, wherein diffraction directions of beams of light diffracted in the two hologram regions for detecting the focus error contains two components of a direction connecting the two hologram regions and a direction perpendicular to the direction connecting the two hologram regions, and the beams of light on the two optical detecting elements for detecting the focus error are in a condition of point symmetry with respect to the central axis of the hologram.

3. An optical signal information reading and writing device according to claim 1, wherein the semiconductor laser, the hologram and the optical detecting element are integrated into one package, and the hologram is composed in such a manner that the beams of light diffracted in the two hologram regions for detecting the focus are converged at a position of point symmetry with respect to an optical axis of emergent light of the semiconductor laser, and the focus error is detected by the optical detecting element.

4. An optical signal information reading and writing device according to claim 1, wherein the hologram has two different hologram patterns in which beams of light diffracted in the two hologram regions for detecting the focus are made asymmetrical with respect to the optical axis of the emergent light of the semiconductor laser so that the respective minus (−) primary light cannot be incident on the optical detecting element for detecting the focus error of each other.

5. An optical signal information reading and writing device according to claim 1, wherein the two hologram regions for detecting the focus error and the two hologram regions for detecting the tracking error are respectively divided with respect to the directions perpendicular to each other.

6. An optical signal information reading and writing device according to claim 1, wherein the two hologram regions for detecting the focus error and the two hologram regions for detecting the tracking error are respectively divided into directions perpendicular to each other, adjustment of offset for detecting the tracking error is conducted by moving the hologram in the directions of the two hologram regions for detecting the tracking error, and adjustment of offset for detecting the focus error is conducted by adjustment in a direction perpendicular to the hologram moving direction for detecting the tracking error and also by adjustment in a direction of rotation of the hologram.

* * * * *